United States Patent
Ohara et al.

(10) Patent No.: US 7,357,003 B2
(45) Date of Patent: Apr. 15, 2008

(54) PROCESS AND APPARATUS FOR SEPARATION OF HYDROCARBONS

(75) Inventors: Susumu Ohara, Chiba (JP); Shoichi Yamaguchi, Chiba (JP); Yasuyuki Yamamori, Chiba (JP); Jahja Evelyne, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 569 days.

(21) Appl. No.: 10/506,241

(22) PCT Filed: Jun. 28, 2004

(86) PCT No.: PCT/JP2004/009101

§ 371 (c)(1),
(2), (4) Date: Sep. 8, 2004

(87) PCT Pub. No.: WO2005/009930

PCT Pub. Date: Feb. 3, 2005

(65) Prior Publication Data

US 2005/0155382 A1    Jul. 21, 2005

(30) Foreign Application Priority Data

Jul. 24, 2003 (JP) ............... 2003-278984
Nov. 6, 2003 (JP) ............... 2003-376939

(51) Int. Cl.
F25J 3/00 (2006.01)
(52) U.S. Cl. .......................... 62/620; 62/621
(58) Field of Classification Search ............. 62/620, 62/621

See application file for complete search history.

(56) References Cited

U.S. PATENT DOCUMENTS

| 4,061,481 A | * | 12/1977 | Campbell et al. ............ 62/621 |
| 4,140,504 A | | 2/1979 | Campbell et al. |
| 4,622,053 A | | 11/1986 | Tomlinson et al. |
| 4,689,063 A | | 8/1987 | Paradowski et al. |
| 4,690,702 A | | 9/1987 | Paradowski et al. |
| 4,846,863 A | | 7/1989 | Tomlinson et al. |

(Continued)

FOREIGN PATENT DOCUMENTS

JP    04-065487    3/1992

(Continued)

*Primary Examiner*—William C Doerrler
(74) *Attorney, Agent, or Firm*—Oblon, Spivak, McClelland, Maier & Neustadt, P.C.

(57) ABSTRACT

There are provided a process for separation of hydrocarbons including the steps of: (a) a feed gas is cooled and partly condensed, and separated into a gas and a liquid; (b) the liquid obtained in step (a) is supplied to a distillation column; (c) the gas obtained in step (a) is expanded by an expander and partly condensed, and separated into a gas and a liquid; (d) the liquid obtained in step (c) is supplied to the distillation column; (e) the gas obtained in step (c) is divided into a first portion and a second portion; (f) the first portion is supplied to the distillation column; (g) the second portion is condensed by being compressed and cooled, and then depressurized and supplied as a reflux to the distillation column; and (h) a residue gas is obtained from the top part of the distillation column and a heavier fraction is obtained from the bottom part of the distillation column; and an apparatus therefor. The process and apparatus enable efficient separation of hydrocarbons.

8 Claims, 1 Drawing Sheet

U.S. PATENT DOCUMENTS

| | | |
|---|---|---|
| 4,854,955 A | 8/1989 | Campbell et al. |
| 4,895,584 A * | 1/1990 | Buck et al. .................... 62/621 |
| 5,114,450 A | 5/1992 | Paradowski et al. |
| 5,275,005 A * | 1/1994 | Campbell et al. ............. 62/621 |
| 5,561,988 A | 10/1996 | Mehra |
| 5,566,554 A | 10/1996 | Vijayaraghavan et al. |
| 5,568,737 A | 10/1996 | Campbell et al. |
| 5,685,170 A | 11/1997 | Sorensen |
| 5,687,584 A | 11/1997 | Mehra |
| 5,881,569 A | 3/1999 | Campbell et al. |
| 5,890,377 A | 4/1999 | Foglietta |
| 5,983,664 A * | 11/1999 | Campbell et al. ............. 62/621 |
| 5,992,175 A | 11/1999 | Yao et al. |
| 6,244,070 B1 | 6/2001 | Lee et al. |
| 6,278,035 B1 | 8/2001 | Key et al. |
| 6,354,105 B1 | 3/2002 | Lee et al. |
| 6,453,698 B2 | 9/2002 | Jain et al. |
| 2001/0052241 A1* | 12/2001 | Jain et al. ...................... 62/621 |
| 2004/0159122 A1* | 8/2004 | Patel et al. .................... 62/620 |
| 2004/0237581 A1* | 12/2004 | Paradowski .................. 62/620 |
| 2004/0261452 A1* | 12/2004 | Mak et al. ..................... 62/620 |
| 2005/0198998 A1* | 9/2005 | Lee et al. ...................... 62/612 |
| 2005/0204774 A1* | 9/2005 | Foglietta et al. .............. 62/620 |

FOREIGN PATENT DOCUMENTS

| | | |
|---|---|---|
| JP | 2002-508054 | 3/2002 |
| WO | 02 14763 | 2/2002 |

* cited by examiner

PROCESS AND APPARATUS FOR SEPARATION OF HYDROCARBONS

TECHNICAL FIELD

The present invention relates to a process and an apparatus for separation of hydrocarbons, both used for separating and recovering ethane or propane from, for example, a natural gas, an associated gas from an oil reserver, or an off-gas from a refinery or a petrochemical plant.

BACKGROUND ART

It has been conducted to separate methane from hydrocarbons having 2 or more carbon atoms, or ethane from hydrocarbons having 3 or more carbon atoms.

For example, as a process for recovering ethane or propane from a natural gas, there is in wide use a process in which a natural gas is cooled and then distillated in a demethanizer (a deethanizer in the case of propane recovery) to separate lighter components from ethane (or propane) and heavier hydrocarbon components. In the process, there is used a propane refrigeration system and a turbo-expander in order to cool the natural gas down to a temperature necessary for the separation. However, the liquid fraction of the outlet stream of the turbo-expander is low and effectiveness of refluxing in the demethanizer (or the deethanizer) is low; resultantly, the recovery ratio of ethane has remained at about 80%.

With respect to this, there is known as "Gas Subcooled Process", by U.S. Pat. No. 4,140,504, a process in which part of the inlet gas of a turbo-expander is withdrawn and is heat-exchanged with a low-temperature overhead gas of a distillation column (a demethanizer or a deethanizer) to increase the liquid fraction and thus improve effectiveness of the refluxing in the demethanizer (or the deethanizer). As a further improved process, there is known as "Recycle Split-vapor Process", by U.S. Pat. No. 5,568,737, a residue gas recycle process in which the overhead gas (residue gas) of a demethanizer (or a deethanizer) is compressed and cooled, and is depressurized to make a low-temperature liquid, and then the liquid is supplied as a reflux to the demethanizer (or the deethanizer).

Owing to these arts, improvement in ethane recovery ratio is made possible; however, it is necessary to withdraw part of the inlet gas of the turbo-expander in order to supply a reflux into the distillation column. Resultantly, the inlet gas of the turbo-expander is not wholly supplied into the turbo-expander; therefore, the cooling effect caused by isentropic expansion is low and the load of refrigeration is large, the recovery of power in the turbo-expander is low, and a further improvement in the energy efficiency of the whole apparatus has been desired. Moreover, in these arts, since a liquid low in methane (or ethane) concentration is used as a principal reflux, effectiveness of the refluxing is not excellent. Therefore, in order to obtain a higher ethane recovery ratio, it is necessary to lower the pressure of demethanizer to heighten separation efficiency. Consequently, power for compressing the residue gas increases, and energy efficiency of the whole apparatus inevitably declines.

DISCLOSURE OF THE INVENTION

An object of the present invention is to provide a process and apparatus capable of conducting separation of hydrocarbons efficiently. More particularly, the object is to improve, in the separation of hydrocarbons using a distillation column, the efficiency of their separation without reducing the energy efficiency.

Another object of the present invention is to provide an improved process for recovery of ethane or propane, which can carry out the recovery at a low cost without reducing the energy efficiency.

According to the present invention, there is provided a process for separation of hydrocarbons to separate a feed gas containing at least methane and a hydrocarbon less volatile than methane, using a distillation column, into a residue gas enriched with methane and lean in the hydrocarbon less volatile than methane and a heavier fraction lean in methane and enriched with the hydrocarbon less volatile than methane, comprising the steps of:

(a) said feed gas is cooled and partly condensed, and separated into a gas and a liquid;

(b) the liquid obtained in step (a) is supplied to a distillation column;

(c) the gas obtained in step (a) is expanded by an expander and partly condensed, and separated into a gas and a liquid;

(d) the liquid obtained in step (c) is supplied to the distillation column;

(e) the gas obtained in step (c) is divided into a first portion and a second portion;

(f) said first portion is supplied to the distillation column;

(g) said second portion is condensed by being compressed and cooled, and then depressurized and supplied as a reflux to the distillation column; and (h) said residue gas is obtained from the top part of the distillation column and said heavier fraction is obtained from the bottom part of the distillation column.

According to the present invention, there is also provided a process for separation of hydrocarbons to separate a feed gas containing at least ethane and a hydrocarbon less volatile than ethane, using a distillation column, into a residue gas enriched with ethane and lean in the hydrocarbon less volatile than ethane and a heavier fraction lean in ethane and enriched with the hydrocarbon less volatile than ethane, comprising the steps of:

(a) said feed gas is cooled and partly condensed, and separated into a gas and a liquid;

(b) the liquid obtained in step (a) is supplied to a distillation column;

(c) the gas obtained in step (a) is expanded by an expander and partly condensed, and separated into a gas and a liquid;

(d) the liquid obtained in step (c) is supplied to the distillation column;

(e) the gas obtained in step (c) is divided into a first portion and a second portion;

(f) said first portion is supplied to the distillation column;

(g) said second portion is condensed by being compressed and cooled, and then depressurized and supplied as a reflux to the distillation column;

(h) said residue gas is obtained from the top part of the distillation column and said heavier fraction is obtained from the bottom part of the distillation column.

In these processes, it is preferred that the residue gas is used as a cooling medium in cooling in step (g).

According to the present invention, there is also provided an apparatus for separation of hydrocarbons to separate a feed gas containing at least methane and a hydrocarbon less volatile than methane into a residue gas enriched with methane and lean in the hydrocarbon less volatile than methane and a heavier fraction lean in methane and enriched with the hydrocarbon less volatile than methane, comprising:
- a distillation column for discharging said residue gas from the top part and discharging said heavier fraction from the bottom part;
- a cooling and separating means for cooling said feed gas to condense a part thereof, and for separating the partly condensed feed gas into a gas and a liquid;
- a line for supplying the liquid obtained by the cooling and separating means to the distillation column;
- an expander for expanding the gas obtained by the cooling and separating means to condense a part thereof;
- a gas-liquid separator connected to the outlet of the expander;
- a line for supplying the condensate obtained by the gas-liquid separator to the distillation column;
- a dividing means for dividing the gas obtained by the gas-liquid separator into a first portion and a second portion;
- a line for supplying said first portion to the distillation column;
- a compressing means for compressing said second portion;
- a cooling means for cooling and condensing the gas compressed by the compressing means;
- a pressure-reducing means for depressurizing the condensate obtained by the cooling means; and
- a line for supplying the condensate depressurized by the pressure-reducing means to the distillation column as a reflux.

According to the present invention, there is also provided an apparatus for separation of hydrocarbons to separate a feed gas containing at least ethane and a hydrocarbon less volatile than ethane into a residue gas enriched with ethane and lean in the hydrocarbon less volatile than ethane and a heavier fraction lean in ethane and enriched with the hydrocarbon less volatile than ethane, comprising:
- a distillation column for discharging said residue gas from the top part and discharging said heavier fraction from the bottom part;
- a cooling and separating means for cooling said feed gas to condense a part thereof, and for separating the partly condensed feed gas into a gas and a liquid;
- a line for supplying the liquid obtained by the cooling and separating means to the distillation column;
- an expander for expanding the gas obtained by the cooling and separating means to condense a part thereof;
- a gas-liquid separator connected to the outlet of the expander;
- a line for supplying the condensate obtained by the gas-liquid separator to the distillation column;
- a dividing means for dividing the gas obtained by the gas-liquid separator into a first portion and a second portion;
- a line for supplying said first portion to the distillation column;
- a compressing means for compressing said second portion;
- a cooling means for cooling and condensing the gas compressed by the compressing means;
- a pressure-reducing means for depressurizing the condensate obtained by the cooling means; and
- a line for supplying the condensate depressurized by the pressure-reducing means to the distillation column as a reflux.

In these apparatuses, it is preferred that the cooling means includes a heat exchanger of which cooling medium is the residue gas withdrawn from the top part of said distillation column.

According to the present invention, since all of the inlet gas of the turbo-expander is passed through the turbo-expander, the recovery of power associated with isentropic expansion is not small; the power required for compression of residue gas to an intended pressure is not large; the cost of compression facility is not high; the energy required for compression during operation needs not increase; and the cost needs not increase. Further, since a gas having a high methane or ethane concentration is compressed and condensed, and the condensed liquid is used as a reflux of a distillation column (a demethanizer in the case of methane recovery and a deethanizer in the case of propane recovery), the methane or ethane concentration in residue gas is high and a high separation efficiency (an ethane or propane recovery ratio) is obtained without lowering the pressure of the distillation column.

Figure 1:
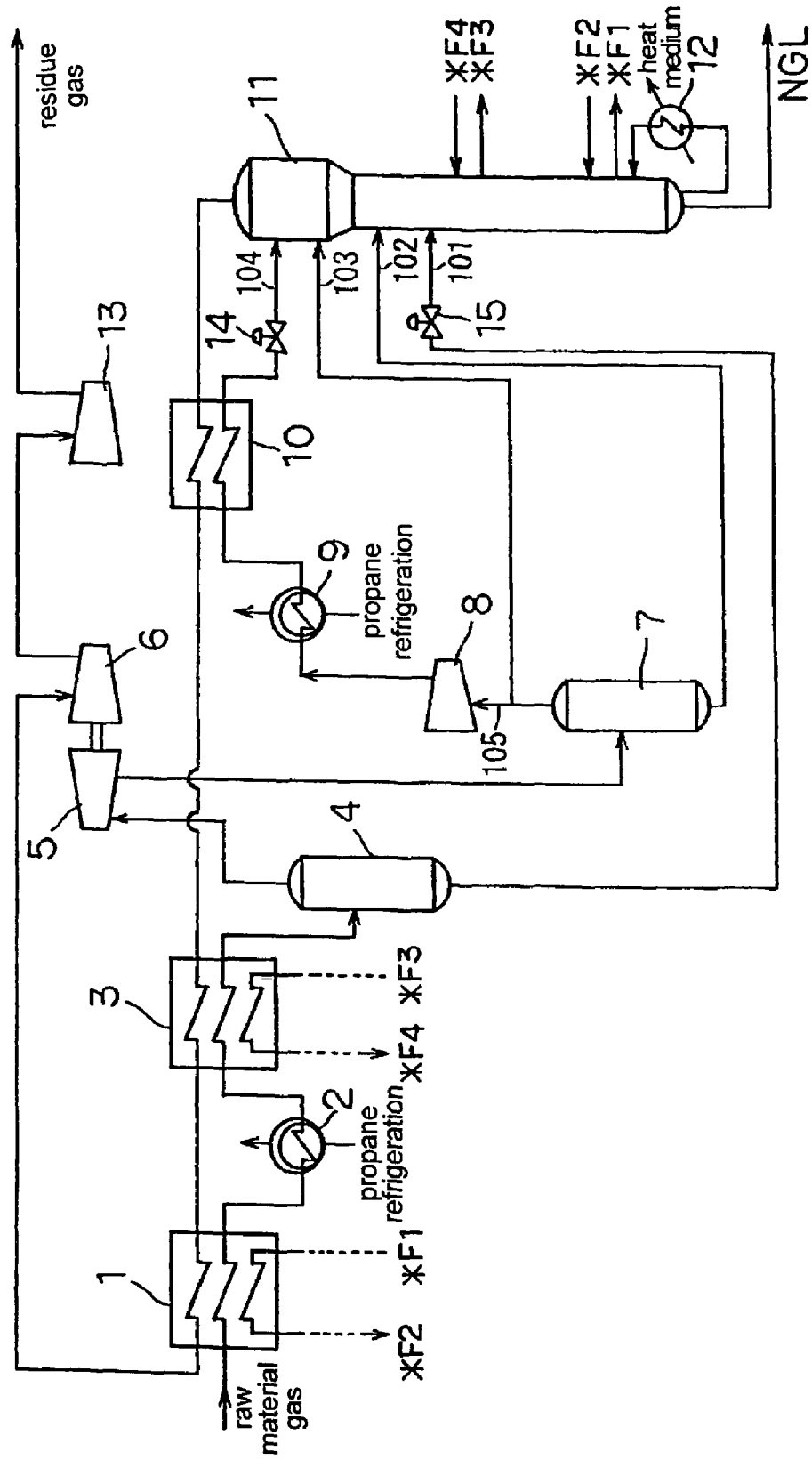
FIG. 1 is a process flow diagram illustrating an example of the process for ethane recovery according to the present invention.

1: first feed gas cooler, 2: feed gas chiller, 3: second feed gas cooler, 4: low-temperature separator, 5: turbo-expander, 6: compressor driven by a turbo-expander, 7: separator at a turbo-expander outlet, 8: low-temperature compressor, 9: reflux cooler, 10: reflux condenser, 11: demethanizer (a deethanizer in the case of a propane recovery plant), 12: reboiler, 13: residue gas compressor, 14: pressure-reducing valve, 15: pressure-reducing valve, 101 to 105: line, F1: demethanizer side stream, F2: return of side stream F1, F3: demethanizer side stream, F4: return of side stream F3.

BEST MODE FOR CARRYING OUT THE INVENTION

In the present invention, it is possible to separate a fluid at the outlet of a turbo-expander into a gas and a liquid; recompress and then heat-exchange the separated gas with a demethanizer overhead gas at a high pressure to cool and condense it; depressurize the resulting condensate by a pressure-reducing valve and supply it to the demethanizer. Here, for compression of the turbo-expander outlet gas, there may be used a compressor driven by, for example, a motor, a steam turbine, a gas turbine or a turbo-expander.

An example of an ethane recovery process is explained with reference to a process flow diagram shown in FIG. 1, in order to explain the objects, features, details and advantages of the present invention. The ethane recovery process referred to herein is a process in which the hydrocarbon components contained in a feed gas are separated by distillation into methane and ethane/heavier components. The ethane recovery process has a distillation column (a demethanizer) and a facility for cooling the feed gas down to a temperature needed for the distillation. Incidentally, the following description and the accompanying drawing are merely for explanation of a preferred embodiment of the present invention and in no way restrict the present invention.

A feed gas such as natural gas or the like is cooled by at least one heat exchanger and is divided into a gas and a liquid by low-temperature separator 4. At this time, the feed gas is cooled by heat exchange with a low-temperature residue gas which is an overhead gas of demethanizer 11, propane refrigeration, and heat exchange with a side stream of the demethanizer. In order to obtain higher recovery ratio of ethane, it is preferable that the temperature of low-temperature separator 4 is lower. For achieving 90% or more of the recovery ratio, the temperature is preferably at most −40° C., more preferably at most −45° C. Proportion of condensed portion of the natural gas, which depends on the composition of the natural gas (proportion of hydrocarbons of which carbon number is 2 or more), may about 5 mole % or more and 20 mole % or less. As a heat exchanger for cooling the feed gas, a known heat exchanger such as a shell & tube type or a plate type heat exchanger may be used as appropriately. For low-temperature separator 4, a vertical or horizontal vessel (a cylindrical vessel having a head at its each end) may be used. In order to improve efficiency of gas-liquid separation, the vessel may have a mist eliminator inside the vessel. In the case of FIG. 1, the feed gas is heat-exchanged with the residue gas and side stream F1 of the demethanizer in first feed gas cooler 1, is cooled by propane refrigeration in feed gas chiller 2, and is heat-exchanged again with the residue gas and side stream F3 of the demethanizer in second feed gas cooler 3. Incidentally, these side streams F1 and F3 are returned to demethanizer 11 after each heat exchange (the return streams are indicated as F2 and F4, respectively).

The outlet gas of low-temperature separator 4 is wholly sent to turbo-expander 5, undergoes isentropic expansion, and thus reaches a very low temperature. The energy which the gas loses during expansion may be recovered as a power for a compressor. Since the outlet gas of low-temperature separator 4 is wholly sent to turbo-expander 5, as compared with when the outlet gas of low-temperature separator 4 is only partially sent to turbo-expander 5 (for example, the arts of U.S. Pat. No. 4,140,504 and the U.S. Pat. No. 5,568,737), the present invention has an advantage in that a larger power can be recovered.

The low-temperature gas leaving turbo-expander 5 is separated into a gas and a liquid in turbo-expander outlet separator 7. At this time, the gas separated in turbo-expander outlet separator 7, as compared with the inlet gas of turbo-expander 5, has a higher methane concentration and is preferable for use as a reflux of the demethanizer. Accordingly, as compared with when the inlet gas of turbo-expander 5 is used as a reflux of the demethanizer (for example, the art described in U.S. Pat. No. 4,140,504), the methane concentration in the residue gas can be made higher. Owing to this advantage, it is possible to decrease the ethane concentration in the residue gas and increase the recovery ratio of ethane.

Incidentally, "reflux" means, in a narrow sense, a liquid which is obtained by condensing an overhead gas of a distillation column and which is turned back to the distillation column. In a broad sense, it includes, in addition to this liquid, even a liquid supplied to the top part of the distillation column for the purpose of rectification. In the present invention, "reflux" is used in a broad sense and includes even a liquid supplied to the distillation column and having a rectification ability.

For turbo-expander outlet separator 7, a vertical or horizontal vessel (a cylindrical vessel having a head at its each end) may be used. In order to improve efficiency of gas-liquid separation, the vessel may have a mist eliminator inside the vessel.

The gas leaving the turbo-expander outlet separator 7 is divided into two streams in order to supply a reflux into the top part of the demethanizer. One stream (line 105) is compressed by low-temperature compressor 8, and the other stream (line 103) is supplied into demethanizer 11. The gas compressed by low-temperature compressor 8 can be condensed at a relatively high temperature with an increase in pressure, and is cooled and condensed by propane refrigeration and heat exchange with low-temperature residue gas at reflux cooler 9 and at reflux condenser 10 respectively. Then, the resulting condensate is depressurized by pressure-reducing valve 14 to the operating pressure of the demethanizer and supplied to a top part of demethanizer 11 as a reflux (line 104).

For low-temperature compressor 8, there may be used a compressor driven by, for example, a motor, a steam turbine, a gas turbine or a turbo-expander. The type of the compressor may be selected from known types such as centrifugal type and reciprocating type as appropriately. As reflux cooler 9 and reflux condenser 10, a known heat exchanger such as a shell & tube type or a plate type heat exchanger may be used as appropriately.

The ratio at which the gas leaving turbo-expander outlet separator 7 is divided into a gas (line 105) which is sent to low-temperature compressor 8 and a gas (line 103) which is supplied to the demethanizer, is preferably such a ratio at which the liquid fraction of a fluid condensing in reflux condenser 10 owing to the heat exchange with the low-temperature residue gas becomes maximum; and the ratio is preferably about 3:7 (30% is sent to the low-temperature compressor and 70% is sent to the demethanizer) to 5:5.

The outlet pressure of low-temperature compressor 8 is preferably elevated to such a level that the condensation temperature of the compressed gas becomes appropriate for heat exchange with the low-temperature gas. From this point of view, the outlet pressure is preferably at least 4.0 MPa and at most 7.0 MPa. The outlet temperature of reflux cooler 9 is preferably a temperature to which it is possible to cool by propane refrigeration. From this point of view, the outlet temperature is preferably at least −40° C. to at most −30° C. The outlet temperature of reflux condenser 10 is preferably such a temperature at which the liquid fraction of the outlet fluid of reflux condenser 10 becomes as high as possible in order to increase the effect of refluxing. The outlet temperature is more preferably cooled to a temperature at which the reflux (line 104) to be supplied to the top part of the demethanizer after being depressurized by pressure-reducing valve 14 can become a saturated liquid or a liquid near saturation. This temperature may be about at least −100° C. and at most −90° C. Reflux cooler 9 may not be provided in order to reduce the load of propane refrigeration when the outlet temperature of reflux condenser 10 can be lowered so as to achieve an intended recovery ratio of ethane, only by heat exchange with the residue gas.

Demethanizer 11 has, for example, trays or packings inside a tower and separates between highly volatile components and less volatile components by distillation operation. The pressure in the demethanizer is preferred to be as high as possible, as long as an intended recovery ratio of ethane is achieved, in order to reduce the power required for compression of the downstream residue gas. From this point of view, the pressure is preferably at least 1.5 MPa and at most 3.5 MPa, more preferably at least 2.5 MPa and at most 3.5 MPa.

Four kinds of fluids are supplied into the demethanizer. Into the demethanizer top part is supplied a reflux (line 104) condensed in reflux condenser 10, via pressure-reducing valve 14; below this point is supplied a gas (line 103) divided from the outlet gas of turbo-expander outlet separator 7; further below this point are supplied a liquid (line 102) separated in turbo-expander outlet separator 7 and, via pressure-reducing valve 15, a liquid (line 101) separated in low-temperature separator 4. With respect to the point at which the liquid (line 102) separated in turbo-expander outlet separator 7 is supplied and the point at which the liquid (line 101) separated in low-temperature separator 4 is supplied, the former is above the latter in FIG. 1; however, the former may be below the latter depending upon the case. More detailed points at which these four kinds of fluids are supplied, may be determined appropriately depending upon the temperature and methane concentration of each fluid.

Reboiler 12 is provided at the bottom part of the demethanizer. A heat is added to the reboiler in order to vaporize methane in bottom liquid so as to keep the methane concentration in bottom liquid at an intended level or lower.

A residue gas from which components such as ethane, propane and the like have been removed and which is composed mainly of methane is separated from the top part of the demethanizer; the residue gas is heat-exchanged with the reflux and the feed gas and then compressed to an intended pressure by compressor 6 driven by the turbo-expander and residue gas compressor 13. From the bottom part of demethanizer 11 are separated ethane, propane and heavier components as NGL (natural gas liquid). The separated NGL is, for example, separated into individual components by a NGL separation step provided further downstream.

The feed gas is preferably, for example, a natural gas containing methane and hydrocarbons less volatile than methane. The feed gas may also be an associated gas from an oil reserver, or an off-gas from a refinery or a petrochemical plant.

As the concentration of hydrocarbons less volatile than methane in a feed gas is higher, there becomes larger the difference between the methane concentration in the inlet gas of turbo-expander 5 and the methane concentration in the outlet gas of turbo-expander outlet gas separator 7 and the effect of improving reflux according to the present invention is obtained more easily. Accordingly, the effect of the present invention is particularly remarkable when the concentration of hydrocarbons less volatile than methane in a feed gas is at least 5 mole % and at most 50 mole %, further particularly at least 10 mole % and at most 50 mole %.

Since a lower concentration of ethane in the residue gas means a higher ethane recovery ratio, the concentration of ethane in the residue gas is preferred to be as low as possible, and is preferably at most 5 mole %, more preferably at most 1 mole %.

The effect of the present invention is remarkable when a higher recovery ratio of ethane is desired. For example, in case that the ethane recovery ratio is 90% or more, further 94% or more, energy required for compression is remarkably reduced compared with prior art (e.g. the art described in U.S. Pat. No. 4,140,504 or the U.S. Pat. No. 5,568,737). In case that inlet gas of turbo-expander 5 is used as a reflux for the demethanizer (e.g., as described in U.S. Pat. No. 4,140,504), when ethane recovery ratio reaches about 90 to 94% or more, it becomes difficult to separate methane from ethane and energy required for compression increases. Contrary, according to the present invention, by using a reflux of which methane concentration is higher, higher separation efficiency is obtained, and ethane recovery ratio may reaches 90% or more, further 94% or more with lower energy.

The NGL is composed of liquefied and recovered hydrocarbons less volatile than methane and is sent into, for example, a NGL fractionation facility provided further downstream for separation into products of ethane, propane, butane, etc. In such a case, the methane concentration in NGL is preferred to be low in such an extent that the specification of ethane product is satisfied, and is preferably 2 mole % or less, more preferably 1 mole % or less.

When a higher ethane recovery ratio is desired in an embodiment for carrying out the present invention, it is possible that the residue gas is compressed by residue gas compressor 13, a part thereof is divided and again cooled and condensed by heat exchange with a low-temperature residue gas and propane refrigeration, and the resulting condensed liquid is depressurized by a pressure-reducing valve and supplied into the top part of demethanizer 11 as a reflux. In this case, the reflux (line 104) leaving pressure-reducing valve 14 is supplied slightly below the demethanizer top part (few trays below when trays are used). In this case, by further using a residue gas of higher methane concentration as a reflux in addition to the reflux using the gas leaving turbo-expander outlet separator 7, a higher ethane recovery ratio can be expected.

The same principle as described above is applied also for a propane recovery process. A deethanizer is used in place of demethanizer 11 and, from the top part of the deethanizer, is separated a residue gas composed mainly of methane and ethane and, from the bottom part of the deethanizer, are separated propane and heavier components as NGL.

The present invention is described below in more detail by way of Example.

EXAMPLE 1

There is described a case in which ethane recovery was conducted using a gas-processing plant constituted as shown in FIG. 1. However, the present invention is in no way restricted thereto. Here, a high-pressure feed natural gas, from which water has been removed beforehand, is introduced into the gas-processing plant under the conditions of 6.24 MPa and 17.1° C. The composition of the feed gas is shown in Table 1. The flow rate is 13,700 kg-mol/hour ($10^3$ mol/hour). Incidentally, Cn (n is a natural number) refers to a hydrocarbon of which carbon number is n. C5+ refers to hydrocarbons of which carbon number is 5 or more.

TABLE 1

| Composition of feed gas (mole %) | |
|---|---|
| $CO_2$ | 1.00 |
| $N_2$ | 0.54 |
| C1 | 89.41 |
| C2 | 4.91 |
| C3 | 2.23 |
| C4 | 1.29 |
| C5+ | 0.62 |
| Total | 100.00 |

The feed gas is cooled to −29° C. in first feed gas cooler 1 by heat exchange with a residue gas of −39.7° C. and a side stream of demethanizer 11 of −23.3° C. Then, the gas is cooled to −37° C. in feed gas chiller 2 by propane refrigeration and to −51.5° C. in second feed gas cooler 3 by heat exchange with a residue gas of −51.5° C. and a side stream of demethanizer 11 of −82.7° C. First feed gas cooler 1 and second feed gas cooler 3 are plate type heat exchangers. Feed gas chiller 2 is a kettle type shell & tube heat exchanger.

Then, the feed gas is separated into a gas and a liquid in low-temperature separator 4. The separated gas contains 93.02 mole % of methane. Low-temperature separator 4 is a vertical vessel (a cylindrical vessel having a head at its each end) which has a mist eliminator inside the vessel.

The outlet gas of low-temperature separator 4 is wholly sent into turbo-expander 5 and depressurized to 3.0 MPa. The outlet gas is cooled to −82.3° C. by effect of isentropic expansion and gives a power of 1,830 kW to compressor 6 driven by the expander. The outlet gas of turbo-expander 5 is separated into a gas and a liquid in turbo-expander outlet separator 7. The separated gas here contains 96.18 mole % of methane. In this gas, methane is enriched compared with the inlet gas of turbo-expander 5. Turbo-expander outlet separator 7 is a vertical vessel (a cylindrical vessel having a head at its each end) which has a mist eliminator inside the vessel.

The gas leaving turbo-expander outlet separator 7 is divided at a ratio of 4:6 and supplied into motor-driven low-temperature compressor 8 and demethanizer 11 respectively (40% (line 105) into the low temperature compressor and 60% (line 103) into the demethanizer). The gas sent into low-temperature compressor 8 is compressed to 6.2 MPa and cooled to −94.7° C. and condensed by propane refrigeration and heat exchange with the low-temperature residue gas in reflux cooler 9 and reflux condenser 10 respectively. The resulting condensed liquid is depressurized to 2.8 MPa by pressure-reducing valve 14 and supplied into the top part of demethanizer 11 as a reflux (line 104). At this time, the power required for low-temperature compressor 8 is 1,540 kW.

Demethanizer 11 has 40 trays inside. The reflux condensed in reflux condenser 10 is supplied as line 104 into the first tray from the top of demethanizer 11 via pressure-reducing valve 14. The gas divided at the outlet of turbo-expander outlet separator 7 is supplied as line 103 into the 8th tray from the top of demethanizer 11. The liquid separated at turbo-expander outlet separator 7 is supplied as line 102 into the 12th tray from the top of demethanizer 11. The liquid separated at low-temperature separator 4 is depressurized to 2.82 MPa by pressure-reducing valve 15 and then is supplied as line 101 into the 17th tray from the top of demethanizer 11. Demethanizer 11 is operated under the conditions of 2.8 MPa and −96.7° C. at the top part and under the conditions of 2.85 MPa and 25.4° C. at the bottom part. The temperature at the bottom part is determined by an equilibrium temperature at which the methane concentration in NGL becomes 1 mole % or less and, in order to operate the bottom part at that temperature, a heat of 2.23 MW is added from reboiler 12. The compositions of the residue gas separated from the top part of demethanizer 11 and the NGL separated from the bottom part of demethanizer 11 are shown in Table 2. The flow rates are 12,385 kg-mol/hour ($10^3$ mol/hour) for the residue gas and 1,315 kg-mol/hour ($10^3$ mol/hour) for the NGL.

TABLE 2

| Compositions of residue gas and NGL (mole %) | | |
|---|---|---|
| | Residue gas | NGL |
| $CO_2$ | 0.31 | 7.48 |
| $N_2$ | 0.60 | 0.00 |
| C1 | 98.79 | 1.00 |
| C2 | 0.29 | 48.44 |
| C3 | 0.01 | 23.18 |
| C4 | 0.00 | 13.44 |
| C5+ | 0.00 | 6.46 |
| Total | 100.00 | 100.00 |

As shown in Table 2, 94.7% of ethane in the feed gas is recovered as NGL.

The residue gas leaving the top part of demethanizer 11 is heat-exchanged with the reflux and the feed gas and is at a temperature of 13.2° C. at the outlet of first feed gas cooler 1. Then, it is compressed to 3.3 MPa by compressor 6 driven by the turbo-expander and further compressed to 3.8 MPa by residue gas compressor 13. At this time, the power required by residue gas compressor 13 is 1,510 kW.

COMPARATIVE EXAMPLE 1

Ethane recovery was conducted using the art (gas subcooled process) of U.S. Pat. No. 4,140,504. The results are shown in Table 3 together with the results of Example 1.

In Table 3, load of refrigeration is the thermal load of propane refrigeration system in a feed gas chiller (feed gas chiller 2 in case of FIG. 1). Being small in this value means that the facility of propane refrigeration system is small.

As is clear from comparison between these examples, in Example 1, as compared with when ethane recovery is conducted using the art described in U.S. Pat. No. 4,140,504, ethane recovery ratio can be increased in spite of smaller load of refrigeration and smaller power for compressor.

Smaller refrigeration load means smaller capacity of propane refrigeration facility, which leads to smaller energy consumed by propane refrigeration facility and lower cost required for propane refrigeration facility.

Smaller power for compressor leads to an advantage of smaller energy consumption. Since an expensive gas turbine is often used as a driver for a residue gas compressor which requires a large power, significant reduction in power for the compressor results in an advantage that a motor, which is relatively inexpensive, may be used as its driver.

TABLE 3

| | Comparative Example 1 | Example 1 |
|---|---|---|
| Ethane recovery ratio | 93.5% | 94.7% |
| Load of refrigeration | 2.90 MW | 2.70 MW |
| Power for compressor | | |
| Residue gas compressor | 3950 kW | 1510 kW |
| Low-temperature compressor | — | 1540 kW |
| Total power for compressors | 3950 kW | 3050 kW |

What is claimed is:

1. A process for separation of hydrocarbons to separate a feed gas comprising at least methane and a hydrocarbon less volatile than methane, in a distillation column, into a residue gas enriched with methane and lean in the hydrocarbon less volatile than methane and a heavier fraction lean in methane and enriched with the hydrocarbon less volatile than methane, comprising the steps of:

(a) said feed gas is cooled and partly condensed, and separated into a gas and a liquid;

(b) the liquid obtained in step (a) is supplied to a distillation column;

(c) the gas obtained in step (a) is expanded by an expander and partly condensed, and separated into a gas and a liquid;

(d) the liquid obtained in step (c) is supplied to the distillation column;

(e) the gas obtained in step (c) is divided into a first gas portion and a second gas portion;

(f) said first gas portion is supplied to the distillation column;
(g) said second gas portion is condensed by being compressed and cooled, and then depressurized and supplied as a reflux to the distillation column; and
(h) said residue gas enriched with methane and lean in the hydrocarbon less volatile than methane is obtained from the top part of the distillation column and said heavier fraction lean in methane and enriched with the hydrocarbon less volatile than methane is obtained from the bottom part of the distillation column.

2. A process for separation of hydrocarbons to separate a feed gas comprising at least ethane and a hydrocarbon less volatile than ethane, in a distillation column, into a residue gas enriched with ethane and lean in the hydrocarbon less volatile than ethane and a heavier fraction lean in ethane and enriched with the hydrocarbon less volatile than ethane, comprising the steps of:
(a) said feed gas is cooled and partly condensed, and separated into a gas and a liquid;
(b) the liquid obtained in step (a) is supplied to a distillation column;
(c) the gas obtained in step (a) is expanded by an expander and partly condensed, and separated into a gas and a liquid;
(d) the liquid obtained in step (c) is supplied to the distillation column;
(e) the gas obtained in step (c) is divided into a first gas portion and a second gas portion;
(f) said first gas portion is supplied to the distillation column;
(g) said second gas portion is condensed by being compressed and cooled, and then depressurized and supplied as a reflux to the distillation column;
(h) said residue gas enriched with ethane and lean in the hydrocarbon less volatile than ethane is obtained from the top part of the distillation column and said heavier fraction lean in ethane and enriched with the hydrocarbon less volatile than ethane is obtained from the bottom part of the distillation column.

3. A process according to claim 1, wherein said residue gas enriched with methane and lean in the hydrocarbon less volatile than methane is used as a cooling medium in cooling in step (g).

4. An apparatus for separation of hydrocarbons to separate a feed gas containing at least methane and a hydrocarbon less volatile than methane into a residue gas enriched with methane and lean in the hydrocarbon less volatile than methane and a heavier fraction lean in methane and enriched with the hydrocarbon less volatile than methane, comprising:
a distillation column for discharging said residue gas enriched with methane and lean in the hydrocarbon less volatile than methane from the top part and discharging said heavier fraction lean in methane and enriched with the hydrocarbon less volatile than methane from the bottom part;
a cooling and separating means for cooling said feed gas to condense a part thereof, and for separating the partly condensed feed gas into a gas and a liquid;
a line for supplying the liquid obtained by the cooling and separating means to the distillation column;
an expander for expanding the gas obtained by the cooling and separating means to condense a part thereof;
a gas-liquid separator connected to the outlet of the expander;
a line for supplying the condensate obtained by the gas-liquid separator to the distillation column;
a dividing means for dividing the gas obtained by the gas-liquid separator into a first gas portion and a second gas portion;
a line for supplying said first gas portion to the distillation column;
a compressing means for compressing said second gas portion;
a cooling means for cooling and condensing the gas compressed by the compressing means;
a pressure-reducing means for depressurizing the condensate obtained by the cooling means; and
a line for supplying the condensate depressurized by the pressure-reducing means to the distillation column as a reflux.

5. An apparatus for separation of hydrocarbons to separate a feed gas containing at least ethane and a hydrocarbon less volatile than ethane into a residue gas enriched with ethane and lean in the hydrocarbon less volatile than ethane and a heavier fraction lean in ethane and enriched with the hydrocarbon less volatile than ethane, comprising:
a distillation column for discharging said residue gas enriched with ethane and lean in the hydrocarbon less volatile than ethane from the top part and discharging said heavier fraction lean in ethane and enriched with the hydrocarbon less volatile than ethane from the bottom part;
a cooling and separating means for cooling said feed gas to condense a part thereof, and for separating the partly condensed feed gas into a gas and a liquid;
a line for supplying the liquid obtained by the cooling and separating means to the distillation column;
an expander for expanding the gas obtained by the cooling and separating means to condense a part thereof;
a gas-liquid separator connected to the outlet of the expander;
a line for supplying the condensate obtained by the gas-liquid separator to the distillation column;
a dividing means for dividing the gas obtained by the gas-liquid separator into a first portion and a second portion;
a line for supplying said first portion to the distillation column;
a compressing means for compressing said second portion;
a cooling means for cooling and condensing the gas compressed by the compressing means;
a pressure-reducing means for depressurizing the condensate obtained by the cooling means; and
a line for supplying the condensate depressurized by the pressure-reducing means to the distillation column as a reflux.

6. An apparatus according to claim 4, wherein said cooling means includes a heat exchanger of which cooling medium is the residue gas enriched with methane and lean in the hydrocarbon less volatile than methane withdrawn from the top part of said distillation column.

7. A process according to claim 2, wherein said residue gas enriched with ethane and lean in the hydrocarbon less volatile than ethane is used as a cooling medium in cooling in step (g).

8. An apparatus according to claim 5, wherein said cooling means includes a heat exchanger of which cooling medium is the residue gas enriched with ethane and lean in the hydrocarbon less volatile than ethane withdrawn from the top part of said distillation column.

* * * * *